United States Patent [19]

Hague et al.

[11] 4,070,739

[45] Jan. 31, 1978

[54] MANUFACTURE OF METAL STRIP

[75] Inventors: David P. Hague; Dalip T. Malkani; Andrew Middlemiss; Stuart Scholey, all of Sheffield, England

[73] Assignee: British Steel Corporation, London, England

[21] Appl. No.: 745,560

[22] Filed: Nov. 29, 1976

[30] Foreign Application Priority Data

Nov. 28, 1975 United Kingdom ............... 49057/75

[51] Int. Cl.$^2$ .............................................. B21D 33/00

[52] U.S. Cl. ....................................... 29/18; 29/17 R; 72/71; 82/100

[58] Field of Search ................. 29/17 R, 18; 82/46 R, 82/100, 101; 72/71

[56] References Cited

U.S. PATENT DOCUMENTS

| | | | |
|---|---|---|---|
| 622,906 | 4/1899 | Watson | 29/18 |
| 3,460,366 | 8/1969 | Musial et al. | 29/17 |
| 3,748,935 | 7/1973 | Beauchet | 82/101 |
| 3,845,678 | 11/1974 | Eggert et al. | 82/100 |

*Primary Examiner*—Lowell A. Larson

*Attorney, Agent, or Firm*—Bacon & Thomas

[57] ABSTRACT

Metal strip is peeled from a rotating cylindrical workpiece whose longitudinal axis is greater than the desired strip width by feeding a first cutting tool into the peripheral surface of the workpiece as it rotates so as to form a groove in the surface which is spaced through one end of the workpiece by a distance equal to the desired strip width, feeding a second cutting tool continuously into the peripheral surface of the workpiece to produce a continuous metal strip of width equal to the distance between the workpiece end and the groove and collecting the peeled strip by winding it around a coiler.

7 Claims, 3 Drawing Figures

10
11
12
13
14
15
16
17
18
19
20
21
22
23
24
25
26
27
28
32

20
40
18
32
13
19
12
17

17

70
32
20
13

MANUFACTURE OF METAL STRIP

This invention relates to the manufacture of metal strip. More especially it is concerned with the manufacture of metal strip having a large width to thickness ratio (e.g. greater than 100:1) by peeling a layer of metal from the periphery of a rotating cylindrical workpiece.

Proposals have previously been made for the production of metal strip which involve peeling a surface layer from a rotating metal workpiece by controllably feeding a cutting tool into the peripheral surface of the workpiece and coiling the peeled strip under conditions of controlled tension to produce a peeled strip product of dimensional tolerance comparable with that of cold rolled strip. The workpiece is in the form of a solid cylinder whose longitudinal axis is equal to the width of the metal strip to be produced. This process suffers from the disadvantage that the production of these relatively short axis workpieces as feedstock requires a considerable amount of high accuracy machining in order to ensure that the end faces of the workpiece are parallel to one another and square to the axis of the billet. This is to ensure that strip of constant width and straightness is produced. Furthermore, each time the workpiece is to be set up in the machine for the peeling operation, considerable delay is involved.

A process employing cylindrical workpieces (e.g. blooms) having relatively long axis would provide advantages in terms of reduced setting-up times and in manufacturing and pre-machining costs. However, an attempt to peel strip from a workpiece having a longitudinal axis greater than the desired strip width would suffer from the disadvantages that initial feeding of the cutting tool into the peripheral surface of one end of the workpiece would impose a loading (i.e. end thrust) upon the tool support and drive in excess of that which can be accepted by present day machinery and the heat generated by frictional engagement of the tool edge and the shoulder of the workpiece would be excessive. The effects of these disadvantages would be to produce non-uniformity of section of the peeled strip giving rise to an unacceptable product. An alternative solution of cutting a relatively long workpiece into discs before peeling is unacceptable because of the resulting large yield loss, extra machining costs and excessive loading times.

It is an object of this invention to provide a method and apparatus for the manufacture of metal strip by peeling a strip-like layer from the peripheral surface of a cylindrical metal workpiece whose longitudinal axis is greater than the desired width of the peeled strip.

According to one aspect of the invention a method of manufacturing metal strip from a cylindrical workpiece whose longitudinal axis is greater than the desired strip width includes rotating the cylindrical workpiece about its longitudinal axis feeding a first cutting tool into the peripheral surface of the workpiece as it rotates so as to form a groove in the surface, said groove being spaced from one end of the workpiece by a distance equal to the desired strip width, feeding a second cutting tool continuously into the peripheral surface of the workpiece between the said one end of the workpiece and the grooved made by the first cutting tool so as to produce a continuous metal strip peeled from the surface of the workpiece of width equal to the distance between the said one end of the workpiece and the said groove, and collecting the peeled strip by winding it around a coiler.

The edge of the peeling tool therefore corresponds approximately to the centre of the groove formed by the parting tool and is therefore not subject to end thrust nor to frictional heating through contact with the shoulder of the workpiece created by the peeling cut.

According to another aspect of the invention, apparatus for manufacturing metal strip from a cylindrical workpiece whose longitudinal axis is greater than the desired strip width includes means for rotating the workpiece about its longitudinal axis, a first cutting tool adapted to cut a groove in the peripheral surface of the workpiece as it rotates at a position spaced from one end of the workpiece by a distance equal to the desired strip width, means for feeding said first cutting tool into the peripheral surface of the workpiece, a second cutting tool adapted to cut a continuous metal strip of said desired strip width from the surface of the workpiece between the said one end of the workpiece and the groove made by the first cutting tool, means for feeding said second tool continuously into the peripheral surface of the workpiece and coiler means for collecting the peeled strip.

In a further aspect, the invention includes metal strip when produced by the method or apparatus defined in the two preceding paragraphs.

The first tool is preferably fed continuously into the peripheral surface of the workpiece as it rotates.

When the diameter of the workpiece has been reduced by peeling to a predetermined value, the first and second cutting tools may be withdrawn to a position clear of the periphery of the workpiece. The workpiece may then be advanced until the second cutting tool extends across a length of workpiece equal to the desired strip width. The first and second tools are then advanced into the workpiece as it rotates and a further metal strip is peeled from the workpiece. Alternatively the first and second tools may be withdrawn when the diameter of the workpiece has been reduced to the predetermined value, and then moved together parallel to the longitudinal axis of the workpiece until the second cutting tool extends across a length of the workpiece equal to the desired strip width and a further peeled strip is then produced by actuation of the workpiece and tools.

The first cutting tool may be positioned so that it engages the workpiece 180° ahead of the second cutting tool. Both the first and the second cutting tools may be fed into the workpiece by a common drive mechanism.

The workpiece may be supported in a self-centering chuck assembly.

An embodiment of the invention will now be described by way of example only with reference to the accompanying drawings in which.

Figure 1:
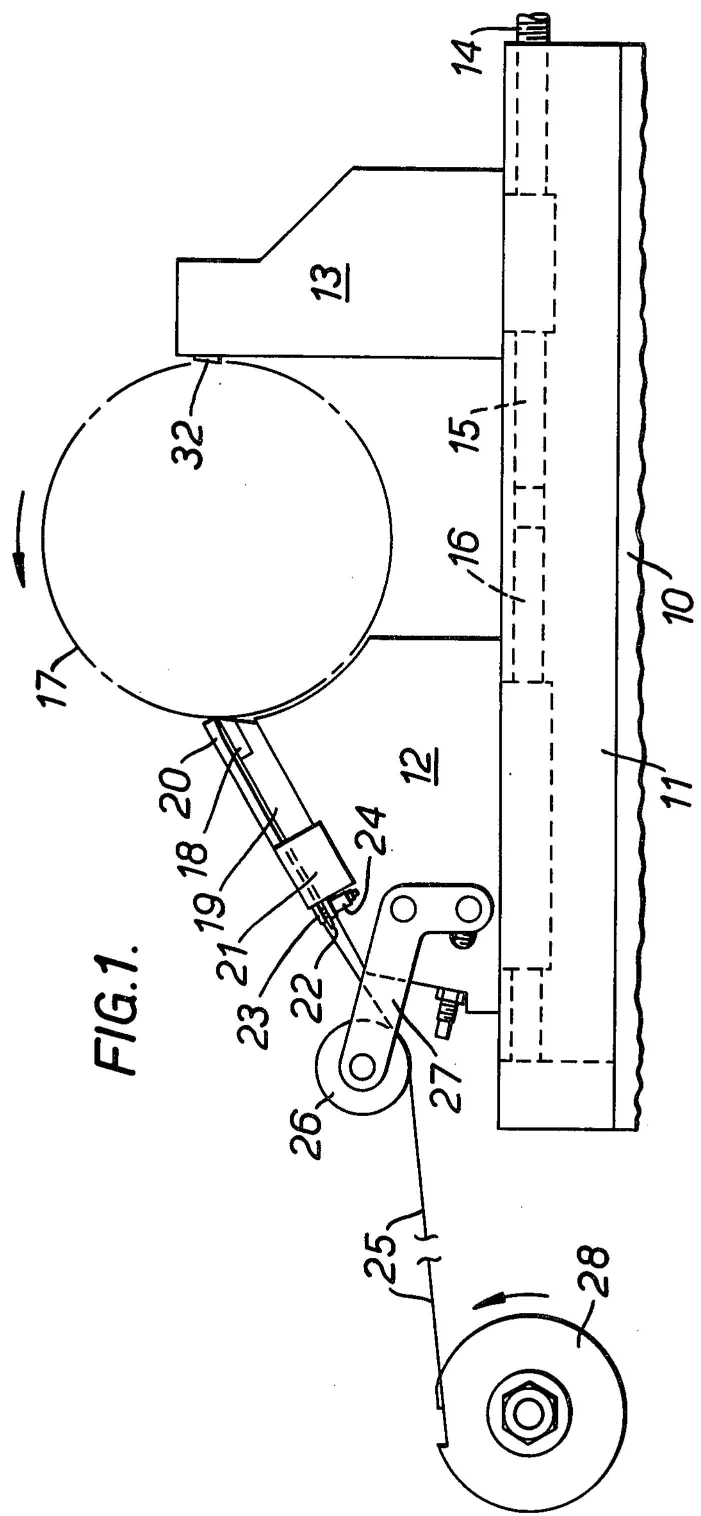
FIG. 1 is an end elevation of an apparatus for manufacturing metal strip.

Referring to FIG. 1, a bedway 10 supports a horizontal slideway 11. A peeling tool holder 12 and a parting tool holder 13 are slidably moveable on the slideway 11 and can be driven towards one another by a common lead screw 14 which is in turn connected to a drive motor (not shown). The lead screw 14 has a first section 15 associated with the parting tool holder 13 which is threaded in an opposite sense to a second section 16 of the lead screw 14 associated with the peeling tool holder 12. A circular cross-section steel billet 17 is mounted for rotation about its longitudinal axis between the peeling tool holder 12 and the parting tool holder 13. The billet 17 is rotatably driven by the same hydraulic motor (not shown) as that which drives the lead screw 14, although the gearing is different.

Figure 2:
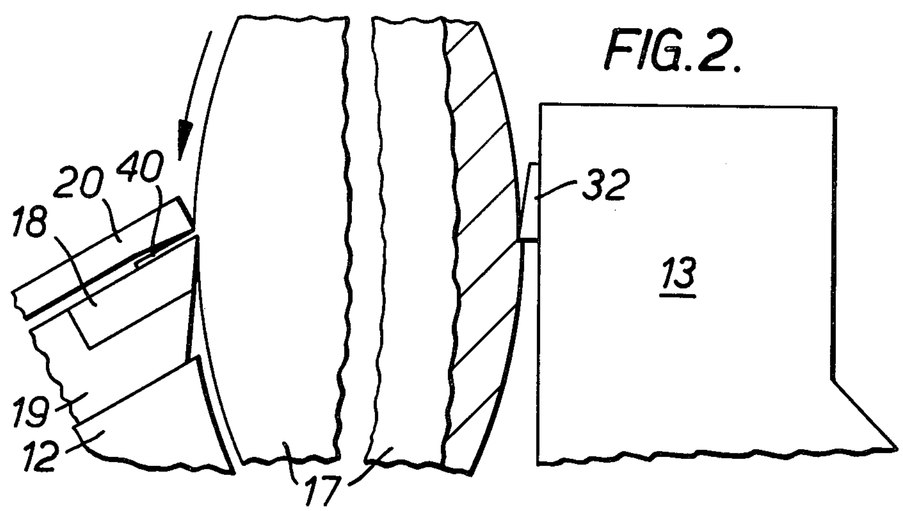
FIG. 2 shows two details of the apparatus in an enlarged split view of part of FIG. 1.
Figure 3:
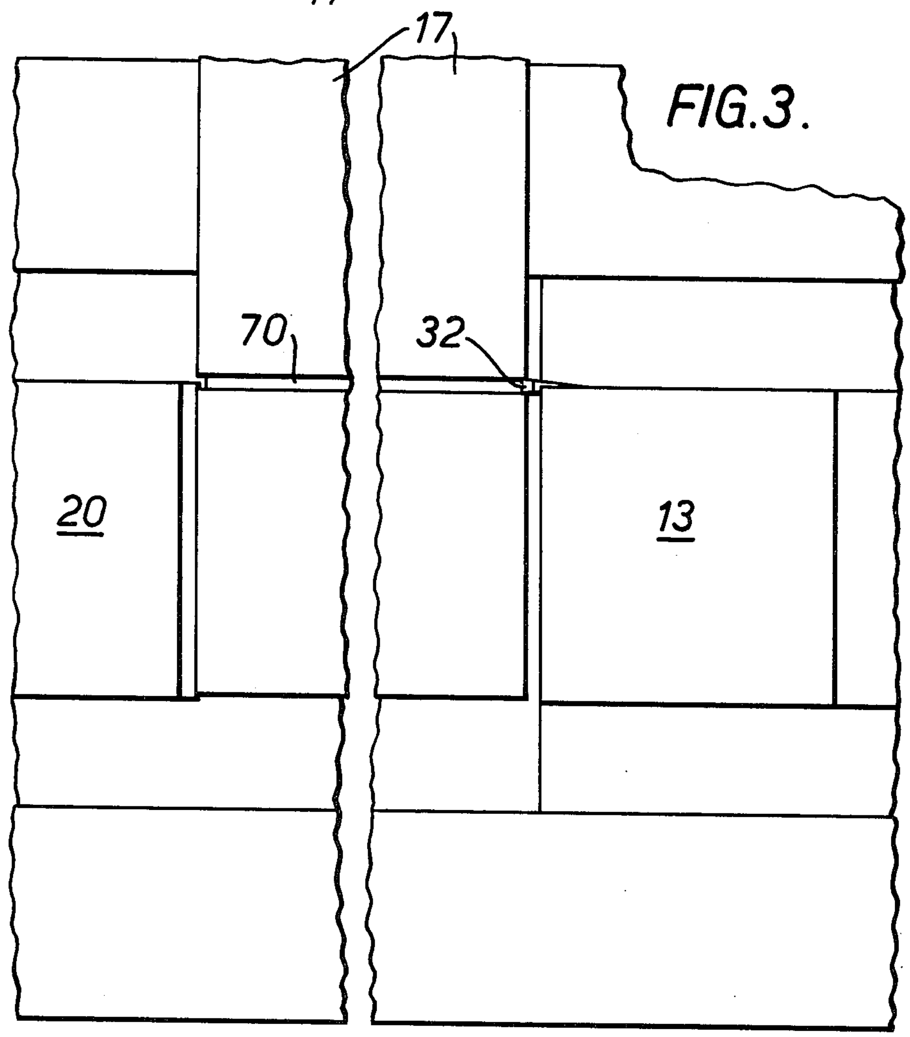
FIG. 3 is a plan view of the details of FIG. 2.

The upper parts of the peeling tool holder 12 and parting tool holder 13 are seen in greater detail in FIGS. 2 and 3.

A peeling tool 18 mounted in a tool block 19 is rigidly secured to the peeling tool holder 12 such that the cutting edge of the peeling tool 18 engages the surface of the billet 17. A strip guide plate 20 is held by a guide plate support 21 mounted on the peeling tool holder 12 so that it is spaced a small distance away from and parallel to the upper surface of the tool block 19. The guide plate 20 extends so that it is almost in contact with the surface of the rotatable billet 17. A parting tool 32 is fitted on the parting tool holder 13 and makes a small groove 70 in billet 17 as it rotates at a position about 10cm from the end of the billet 17.

Two locating pins 22 extend from the guide plate support 21 on the side of the support 21 distant from the tool block 19. The pins 22 are spaced apart from one another by a distance slightly greater than the width of the peeling tool 18. Prior to the commencement of strip peeling a clamp 23 is fitted on the locating pins 22 such that the jaws of the clamp 23, which are resiliently biased towards one another by two sets of disc springs 24, are held apart by the pins 22. A guide strip 25 made of shim steel is attached to the clamp 23 and extends away from the guide plate support 21 around the lower portion of an idler roller 26 mounted on an adjustable arm 27 which is fitted on the peeling tool holder 12. The guide strip 25 at its end distant from the clamp 23 is attached to the periphery of a coiling drum 28. The drum 28 is drivable in the direction shown by the arrow in FIG. 1 by drive means (not shown) which is independent of the hydraulic drive for the rotatable billet 17.

Upon starting-up the equipment, the billet 17 commences rotation, gradually increasing its peripheral speed, whilst the parting tool 32 and the peeling tool 18 are simultaneously driven into the peripheral surface of the billet 17. Since the parting tool 32 cuts a narrow groove about 180° before the peeling tool 18, and 10cm along the length of the billet 17, the peeling tool which is 10cm wide is able to cut cleanly a just less than 10cm width of steel strip 40 with free edges from the billet 17. The leading portion of the peeled strip 40 passes down the gallery formed between the lower surface of guide plate 20 and the upper surface of the tool block 19 reaching the position shown in FIG. 1. The coiling drum drive is then actuated, either manually or in response to a sensor (not shown) which determines the presence of the strip 40 at the clamp 23, and the guide strip 25 is pulled around the coiling drum 28. The guide strip 25 in turn pulls the clamp 23 off the locating pins 22, the disc springs 24 causing the jaws of clamp 23 to grip the leading section of peeled strip 40 and the peeled strip 40 is thereby pulled under tension around the coiling drum 28. The idler roller 26 ensures that the peeled strip 40 is pulled away from the billet 17 at a constant angle, irrespective of the changing diameter of the coil of peeled strip accumulating on the coiling drum 28. Further details of the operation of the clamp 23 and guide strip 25 are disclosed in out co-pending United Kingdom Patent Application No. 49056. In both cases the workpiece may be of annular configuration.

The apparatus is now run until the section of billet 17 which is being peeled is reduced to a small diameter, the peeled strip 40 being gathered on the coiling drum 28. The apparatus is then stopped and the full coiler drum 28 removed and replaced with an empty drum complete with guide strip 25 and clamp 23. At the same time the peeling tool holder 12 and the parting tool holder 13 are returned to their original position and the billet 17 is advanced so that the next section of billet 17 is presented to the peeling tool 18. The operation of the apparatus is then repeated in the manner described previously. The peeled strip 40 which was accumulated on the coiler drum 28 is decoiled onto a separate mandrel (not shown) so that the coiler drum and clamp can be re-used in the apparatus.

We claim:

1. A method of manufacturing metal strip from a cylindrical workpiece whose longitudinal axis is greater than the desired strip width including rotating the cylindrical workpiece about its longitudinal axis, feeding a first cutting tool into the peripheral surface of the workpiece as it rotates so as to form a groove in the surface having a depth not less than the required thickness of strip peeled from the workpiece, said groove being spaced from one end of the workpiece by a distance equal to the desired strip width, feeding a second cutting tool continuously into the peripheral surface of the workpiece between the said one end of the workpiece and the groove made by the first cutting tool so as to produce a continuous metal strip peeled from the surface of the workpiece of width equal to the distance between the said one end of the workpiece and the said groove, the cutting tool being dimensioned so that it overlaps the said one end of the workpiece and extends into said groove to a position spaced from the shoulder of the workpiece created by the peeling operation and collecting the peeled strip by winding it around a coiler.

2. A method as claimed in claim 1 wherein the first tool is fed continuously into the peripheral surface of the workpiece as it rotates.

3. A method as claimed in claim 1 further comprising the steps of withdrawing the first and second cutting tools to positions clear of the periphery of the workpiece once the diameter of the workpiece has been reduced by peeling to a predetermined value, effecting relative movement between the cutting tools and the workpiece so that the second cutting tool extends across the length of the workpiece equal to the desired strip width, and advancing the first and second tools into the workpiece as it rotates to peel a further metal strip from the workpiece.

4. Apparatus for manufacturing metal strip from a cylindrical workpiece whose longitudinal axis is greater than the desired strip width including means for rotating the workpiece about its longitudinal axis, a first cutting tool adapted to cut a groove in the peripheral surface of the workpiece as it rotates at a position spaced from one end of the workpiece by a distance equal to the desired strip width, means for feeding said first cutting tool into the peripheral surface of the workpiece, a second cutting tool adapted to cut a continuous metal strip of said desired strip width from the surface of the workpiece between the said one end of the workpiece and the groove made by the first cutting tool, the cutting tool being so dimensioned so that it overlaps the said one end of the workpiece and extends into said groove to a position spaced from the shoulder of the workpiece created by the peeling operation means for feeding said second tool continuously into the peripheral surface of the workpiece and coiler means for collecting the peeled strip.

5. Apparatus as claimed in claim 4 wherein the first cutting tool is positioned so that it engages the workpiece 180° ahead of the second cutting tool.

6. Apparatus as claimed in claim 4 wherein both the first and second cutting tools are fed into the workpiece by a common drive mechanism.

7. Apparatus as claimed in claim 4 wherein the workpiece is supported in a self-centering chuck assembly.

* * * * *